United States Patent
Morgan et al.

(10) Patent No.: US 6,453,067 B1
(45) Date of Patent: Sep. 17, 2002

(54) BRIGHTNESS GAIN USING WHITE SEGMENT WITH HUE AND GAIN CORRECTION

(75) Inventors: Daniel J. Morgan, Denton, TX (US); Andrea C. Harriman, Yardley, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/175,810

(22) Filed: Oct. 20, 1998

Related U.S. Application Data

(60) Provisional application No. 60/062,583, filed on Oct. 20, 1997.

(51) Int. Cl.[7] ............................................. G06K 9/00
(52) U.S. Cl. ............................................ 382/162; 358/518
(58) Field of Search ............................ 382/162, 166, 382/167; 358/500, 518, 520, 509, 510, 512

(56) References Cited

U.S. PATENT DOCUMENTS

| | | | | |
|---|---|---|---|---|
| 4,704,605 A | * | 11/1987 | Edelson | 340/728 |
| 5,517,335 A | * | 5/1996 | Morgan | 358/518 |
| 5,798,753 A | * | 8/1998 | Zhou et al. | 345/154 |
| 5,995,448 A | * | 11/1999 | Krehbiel | 367/70 |
| 2001/0033364 A1 | * | 10/2001 | Cabib et al. | 351/221 |

FOREIGN PATENT DOCUMENTS

| | | | | |
|---|---|---|---|---|
| EP | 0339938 B1 | * | 2/1989 | H04N/11/04 |
| GB | 2236450 A | * | 4/1991 | H04N/1/40 |

OTHER PUBLICATIONS

Application No. 09/085,992 filed May 27, 1998.

* cited by examiner

*Primary Examiner*—Jerome Grant, II
(74) *Attorney, Agent, or Firm*—Charles A. Brill; Wade James Brady, III; Frederick J. Telecky, Jr.

(57) ABSTRACT

A display system (902) and method for increasing the brightness of an image through the use of a color wheel (504) having white light generating segment. The display system comprises a RGBW processing function (906), a hue correction function (906), and a gain correction function (904). The RGBW processing function (906) includes circuitry to generate an intensity word for use during the white light generating segment. The hue correction function (906) includes circuitry to adjust the relative intensities of the primary color components to compensate for the addition of the white segment data. The gain correction function (904) includes circuitry to adjust the intensity of pixel data based on the white content of the pixel and the intensity of the pixel. After the pixel data is processed, it is formatted by data formatting logic (912) and displayed using a spatial light modulator (914).

33 Claims, 3 Drawing Sheets

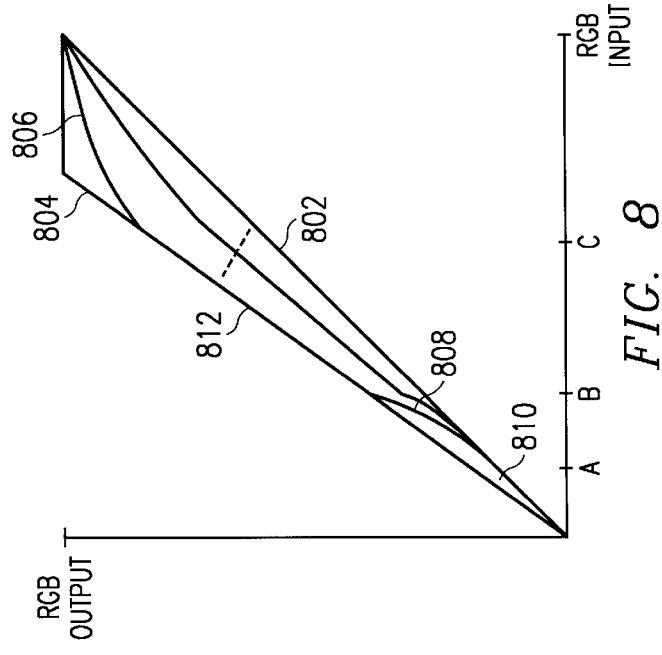
FIG. 4
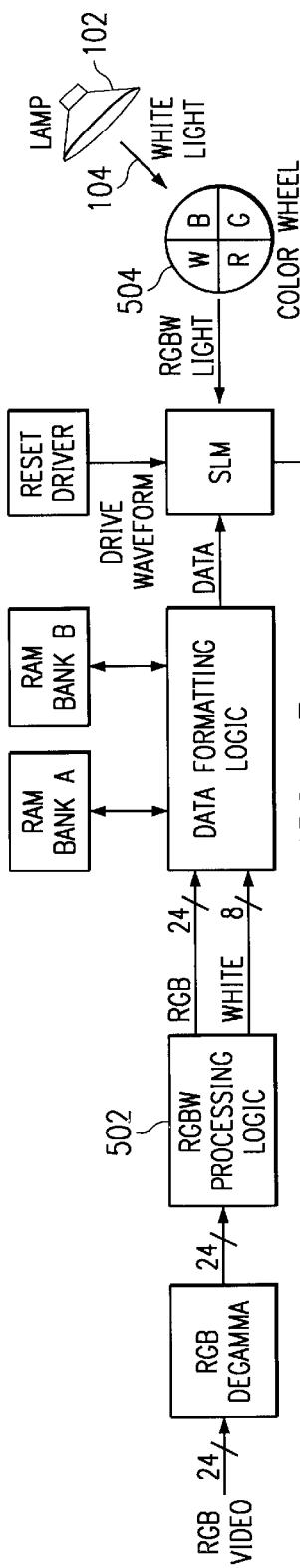
FIG. 8
FIG. 5

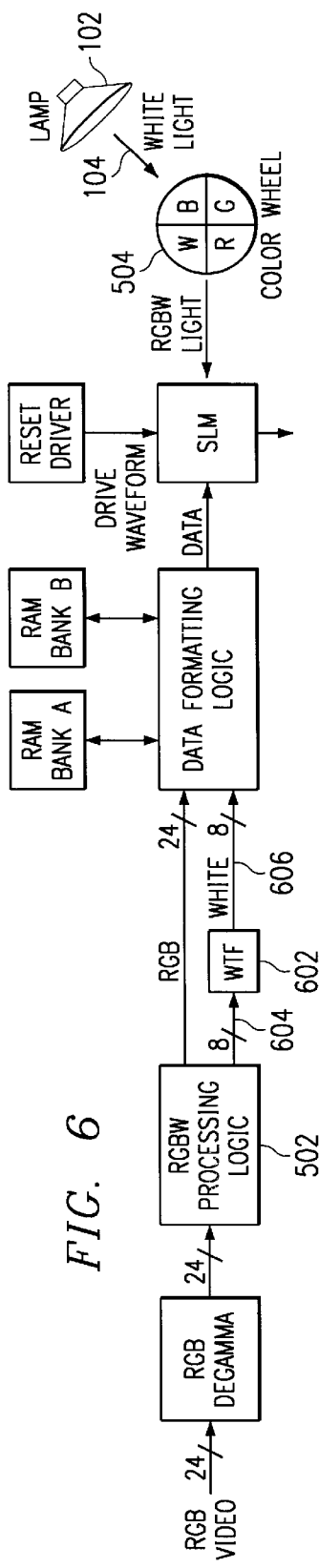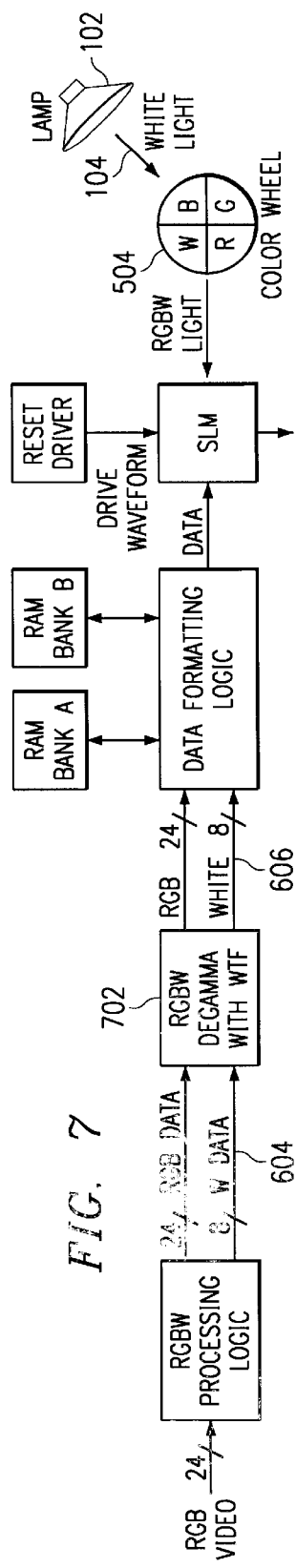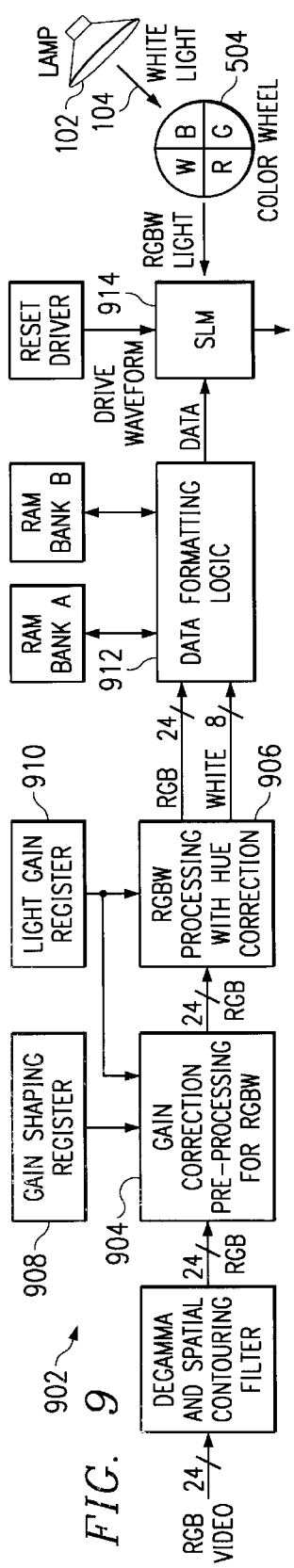

BRIGHTNESS GAIN USING WHITE SEGMENT WITH HUE AND GAIN CORRECTION

CROSS-REFERENCE TO RELATED APPLICATIONS

This application claims priority under 35 USC §119(e)(1) of provisional application No. 60/062,583 filed Oct. 20, 1997.

The following patents and/or commonly assigned patent applications are hereby incorporated herein by reference:

| Pat. No. | Filing Date | Issue Date | Title |
| --- | --- | --- | --- |
| 09/085,992 | May 27, 1998 | | Adaptive White Light Enhancement for Displays |

FIELD OF THE INVENTION

This invention relates to the field of display systems, more particularly to sequential color display systems.

BACKGROUND OF THE INVENTION

Image display systems create images by emitting, or modulating, light. The light forms an array of picture elements, or pixels, which together form an image. Full-color images are formed by creating three independent single-color images. Simultaneous color systems, such a cathode ray tube (CRT) based display systems, use three electron guns simultaneously to stimulate three color-generating phosphor regions for each pixel on the CRT screen. Sequential color systems typically use either three single-color light sources that are sequentially enabled, or a white-light source in combination with a sequential filter such as a color wheel.

Display systems are judged by many metrics, including horizontal and vertical resolution, brightness, color purity, display size, frame rate, and immunity from device created image artifacts, by which display systems are judged. Some of these characteristics are more important to consumers, either because they create a noticeably superior image, or simply because they differentiate between the systems on display in a store.

Brightness, or image intensity, is one metric that is extremely important to purchasers of display systems. Consumers' preference for bright images places particular burden on the designers of color wheel based sequential color systems since only one-third of the light from the white light source is used at any given time. This inefficiency requires the use of a larger light source and more power compared to simultaneous color systems that rely on beam splitters. Therefore, methods and systems to increase the image brightness of sequential color systems are needed in the art.

SUMMARY OF THE INVENTION

Objects and advantages will be obvious, and will in part appear hereinafter and will be accomplished by the present invention which provides a display system and method for achieving a brightness gain using a white segment with hue and gain correction. One embodiment of the claimed invention provides a method of converting image data from a three-primary color system to a three-primary and one-combined color system. The method comprising: providing three-color image data for a pixel, assigning a value dependent on a smallest of the primary color intensity input words to a combined color intensity word, and scaling the primary color intensity input words to create primary color intensity output words.

Another embodiment provides a method of converting image data from a three primary color system to a three primary and one combined color system. This method comprises the steps of providing three-color image data for a pixel, assigning a value dependent on a smallest of the primary color intensity input words to a combined color intensity word, and assigning a value to each of three primary color intensity output words, each said assigned value equal to the sum of the corresponding primary color intensity input word and a hue correction value.

Another embodiment provides a method of converting image data from a three primary color system to a three primary and one combined color system. This method comprises the steps of providing three-color image data for a pixel, assigning a white component intensity value as a function of a minimum of the primary color input intensity words, determining a saturation value for the pixel, calculating a gain level based on the saturation level, adjusting the gain level based on a maximum of the three primary color input intensity words, and scaling each of the primary color input intensity words by the adjusted gain level to achieve an output intensity word for each of the three primary colors.

A display system comprising: an image data processing circuit and an image forming device. The image data processing circuit for receiving an input signal representing three primary color intensity words and generating a four color output signal comprised of an intensity data word for each of three primary colors and a combined color. The image data processing circuit further comprising a combined color intensity data generating circuit for generating an intensity word for the combined color, a gain correction circuit for adjusting the primary color intensity data based on a saturation level of the intensity data, and a hue correction circuit for adjusting the primary color intensity data to compensate for the addition of the combined color intensity data.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a plot of the output intensity versus input intensity of a display system using a white segment according to the present invention.

FIG. 5 is a block diagram of a display system having a four segment color wheel and using RGBW processing circuitry to generate a white segment output data value for each pixel.

FIG. 6 is a block diagram of a system similar to the system of FIG. 5, and having a white transfer function block to alter the white segment data.

FIG. 7 is a block diagram of a system similar to the system of FIG. 6, and having a combined white transfer function and degamma block.

FIG. 8 is a plot of a gain correction curve having a unity gain segment, a constant gain saturated color gain segment, and two smoothing segments.

FIG. 9 is a block diagram of a display system utilizing a four-segment color wheel with RGBW processing and both gain correction and hue correction.

DETAILED DESCRIPTION OF THE PREFERRED EMBODIMENTS

Figure 1:
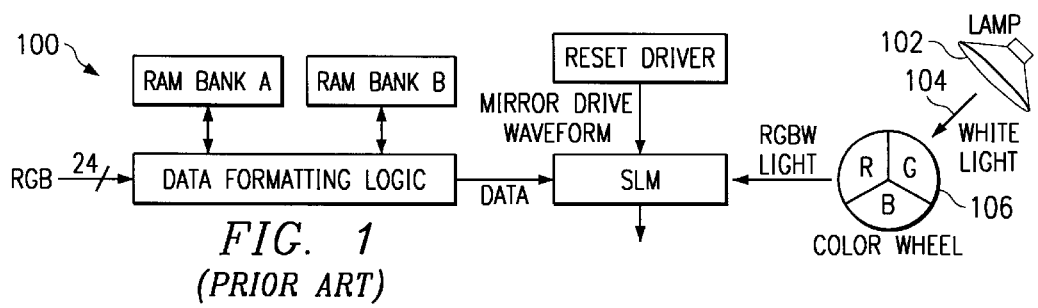
FIG. 1 is a block diagram of a three-segment color wheel display system of the prior art.

FIG. 1 shows a sequential color display system 100. The system of FIG. 1 uses a white light source 102 to generate a beam of light 104. The beam of white light 104 passes through, or reflects from, a small portion of a spinning color wheel 106. The color wheel 106 traditionally includes three sections covered by red (R), blue (B), and green (G) filters. As the light strikes each filter, the white light is filtered to yield a single-color beam of light 108 whose color varies over time.

The single-color beam of light 108 is modulated by a spatial light modulator 110 to form an image-bearing beam of single-color light. Spatial light modulator 110 is typically a digital micromirror device (DMD) or a liquid crystal device (LCD). Spatial light modulator 110 is either a reflective or transmissive light modulator. Spatial light modulator 110 selectively reflects or transmits light in response to an input image signal 112.

Signal processor 114 receives the input image signal and converts the input image signal to data that can be used by the spatial light modulator 110 to create three single-color images. For example, the signal processor separates each 24-bit input image word into three 8-bit single-color images words for each pixel. As each single-color filter in the color wheel rotates through the light beam 104, the image data for the corresponding 8-bit single-color image is transferred to, and displayed by, the spatial light modulator 110. The spatial light modulator typically uses a pulse-width-modulation scheme to selectively transfer a proportional amount of light to the image plane.

The image-bearing beam of light, whose color changes over time as each filter in the color wheel 106 enters the light path, is focused on an image plane on which the image that is formed is viewed. Because the color wheel spins at a high rate, typically two revolutions per image frame, the sequential single-color images are not seen by the viewer. Instead, the viewer's eye integrates the three sequential images and perceives a full-color image.

While display systems using a single modulator are relatively inexpensive to produce, there are several drawbacks. For example, motion artifacts can be created when the viewer's eye tracks moving portions of the image. Image brightness, however, is perhaps the biggest image quality problem faced when designing a single-chip display system.

Single-chip display systems typically are only one-third as bright as three-chip systems having the same power light source. This is because at any given time two of the three component colors of the white light beam are separated by the color wheel and not used to produce an image.

An alternative to the single-SLM display system uses three separate modulators simultaneously to modulate three single-color light beams. The color wheel used in the one-SLM system is replaced with a color-splitting prism assembly that separates the white light beam into three single-color light beams and directs the three single-color light beams to three separate SLMs. The three SLMs simultaneously modulate the three single-color light beams that are then recombined into a single full-color light beam. While brighter than the single-SLM system, the cost of a three-SLM display system is too high for many applications.

Figure 2:
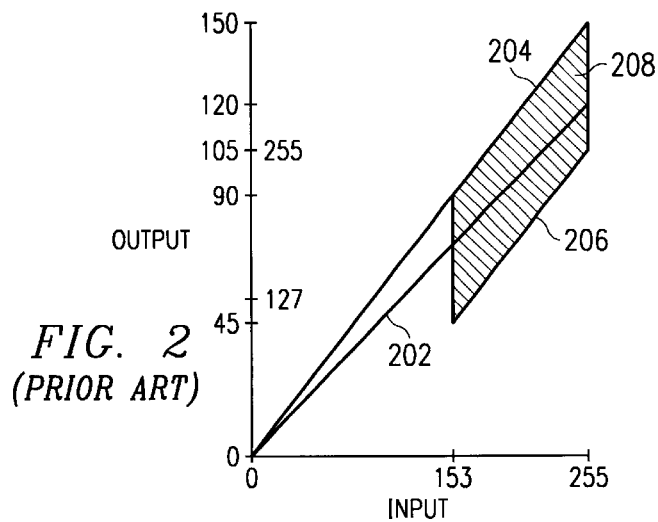
FIG. 2 is a plot of the output intensity versus input intensity of a prior art display system having a 1-bit white segment.

FIG. 2 is a graph of the input intensity word for a single color versus the output brightness. The x-axis is the value of the 8-bit input intensity word, shown as a decimal value from 0 to 255. An 8-bit input word is chosen for purposes of illustration and not for purposes of limitation. Other word sizes are equally valid. The input intensity word represents the desired brightness of the corresponding image pixel. As described above, each input intensity word is processed to obtain an output word representing the desired brightness of the image pixel.

The translation function used to convert an input intensity word to an output intensity word depends on several system characteristics. For example, a 10-bit display system may convert an 8-bit input word to a 10-bit output word. Additionally, a display system may scale the data to compensate for a unique gamma function, or to compensate for light source that has a particularly intense primary component for a given primary color.

The y-axis of FIG. 2 represents the output intensity of an input intensity word as indicated by the x-axis. The plot of FIG. 2 is of a single color of a three color pixel, and the scale of the y-axis is chosen to indicate the amount of available single-color light used to form the pixel. The y-axis of FIG. 2 is labeled in color wheel degrees equivalent to a three-segment color wheel based.

For example, a basic three-color projection system using a color wheel has three equalsized segments in the color wheel. Each of these segments occupies 120° of the available 360°. Line 202 shows output value of a pixel for each input intensity value for this three-segment system.

Most natural images do not contain saturated colors. In other words, most natural images have a relatively large white component. Three-color image systems recreate this white component by blending equal portions of the three primary colors. Since the most common primary colors are red, green, and blue, the white created by blending the three primary colors will be referred to as primary white, or simply RGB-white.

Blending the primaries to create white light is not an efficient use of the white light source. Since only one-third of the available light is used at any given time, the maximum intensity of the RGB-white is one-third the intensity of the light source. A more efficient method of generating the white component of an image is to include a clear segment in the color wheel, The clear segment transmits white light from the source to the spatial light modulator. In effect, the light throughput of the clear segment is equivalent to three equal-sized single-color segments since the clear segment passes red, green, and blue light. White light from the clear segment will be called white-white, or simply W-white. Of course the clear segment could actually be a filter to eliminate some undesirable wavelengths from a less than ideal white light source.

Line 204 of FIG. 2 shows the maximum single-color intensity available from a color wheel having a 45° clear segment. A 45° clear segment leaves 315° to be divided among the three single-color segments—or 105° for each segment. One method of utilizing the clear segment is to scale the intensity values for each of the single-color segments to increase the output data words for each color. Once the white content crosses an input intensity threshold, 153 in the example shown in FIG. 2, the white segment is turned on to enable W-white light while some of the RGB-light is subtracted from the output data word. As the input data value continues to increase, the W-white remains constant while the RGB-white value, shown by line 206, increases until it reaches a maximum amount. The system represented by FIG. 2 only requires 1-bit of output image data for the white segment. Other systems operating on the same principle as the system of FIG. 2 utilize 2 or more bits of image data for the white segment.

The shaded portion 208 of FIG. 2 represent the W-white produced by using the clear segment. In FIG. 2 the shaded portion 208 represents the equivalent of a 45° wheel segment. Thus, the white content of input intensity values less than 153 are generated using only the single-color filter segments (RGB-white), while the white content of input intensities 153 or greater is generated using both RGB-white and W-white. For example, the white content of a gray signal with an intensity value of 153 is produced using 45° RGB-white and the 45° white segment W-white to yield the equivalent of 90° of white. As shown by FIG. 2, a maximum input data value results in the equivalent of 150° of light from each of the three primary colors. Of the 150°, 105° is produced by the single-color filter while the other 45° is produced by the clear segment.

The system described above and represented by line 206 has several drawbacks. First, it is very difficult to manufacture dichroic filters that deliver an RGB-white having the same color-temperature of the white light source. Even slight differences in color temperature create false contours or other artifacts that are very perceptible to image viewers. These artifacts, sometimes called boundary artifacts, are especially noticeable in regions in which the white content crosses the threshold indicated by point "A."

Figure 3:
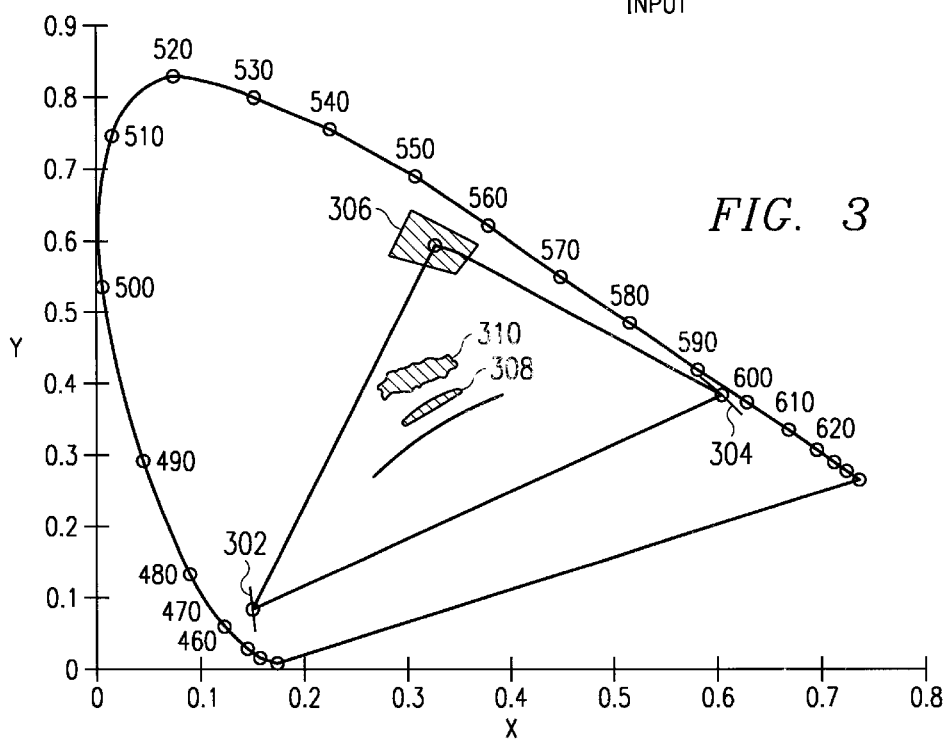
FIG. 3 is a color chart showing the impact of filter variance on the color temperature of white light from a display system.

FIG. 3 is a color chart showing the impact of filter variance on the color temperature of the displayed white light. In FIG. 3, the blue light transmitted by the blue segment of the color wheel varies over region 302. The red light transmitted by the red segment of the color wheel varies over region 304. The green light transmitted by the green segment of the color wheel varies over region 306. In addition to the variations introduced by the filter variances, the color temperature of the source varies over region 308. Combining the filter variances yields a RGB-white that varies over region of 310.

Since the color temperature of the RGB-white is noticeably different than the color temperature of the W-white, a white level threshold artifact is created by the display system. This artifact is created anytime an image contains pixels generated using only RGB-white and pixel generated with both W-white and RGB-white, The artifact is particularly noticeable when two large regions abut, one region generated using only RGB-white at an intensity immediately below the white level threshold and the other region generated using both RGB-white and W-white at a combined intensity immediately above the white level threshold.

The white level threshold artifact typically is eliminated by adjusting the levels of red, green, and blue subtracted from the RGB-white above the threshold so that the color temperature of the combined RGB-white and W-white above the threshold matches the color of the RGB-white below the threshold. This adjustment varies from system to system depending on the characteristics of the color wheel filters and light source. Thus, each system must be calibrated as part of the assembly process. It is advantageous to eliminate this calibration process.

A new method of utilizing a white segment that does not create the visual artifact described above and therefore needs no calibration is shown in FIG. 4. In FIG. 4, the shaded portion 402 of the output represented by the light from the white segment is gradually added to the image. Ignoring other image processing requirements such as degamma, the output data words for each of the primary color components, shown by line 404, is equal to the input data word. Gradually adding W-white light as the white content of the input image data increases requires several bits of data for the white segment.

FIG. 5 is a block diagram of a display system using a four segment color wheel 504. The display system in FIG. 5 includes a RGBW processing circuit 502 for generating a white segment output data value for each pixel. In its simplest form, the RGBW processing circuit sets the white value for each pixel equal to the minimum of the three primary color output data words. The effective gain applied to each pixel depends on the relative sizes of the white and colored filter segments, and on the white content of the pixel.

The system shown in FIG. 5 eliminates the boundary artifacts described above that are generated when some pixels utilize W-white while other pixels utilize RGB-white. This is because all of the white portions of a projected image are formed using both RGB-white and W-white. Therefore, the perceived color temperature of all the white portions of the image is the average of the source color temperature and the RGB-white color temperature.

A slightly more complex display system is shown in FIG. 6. In FIG. 6, the white segment data value is input to a white transfer function block 602. The white transfer function block scales the white segment data value, typically by a non-linear transfer function. For example, the white segment output data value 606 is set equal to the square of the white segment input data value 604 divided by the maximum possible white segment input data value. This transfer function sets the white segment intensity value equal to the white content of pixels having a maximum white content but adds very little white content to pixels having little white content.

Reducing the white content added to saturated pixels reduces the effect of artifacts created by the added white. Since very few naturally occurring colors are saturated, most of the pixels with little white content—that is, most of the pixels with a small minimum red, green, or blue value—are dim pixels. Any processing done to the relatively dim pixels adds quantization errors. Quantization errors are easily seen in regions of relatively dim pixels since the error is a relatively large percentage of the overall pixel intensity.

The white transfer function block 602 of FIG. 6 may represent any one of many other transfer functions. For example, the white transfer function may result in zero W-white being added to the image for pixels with little white value, and then linearly ramp up the amount of W-white added for pixels with higher white values. As described above, the ideal white transfer function limits or eliminates the W-white added to dim pixels where any artifacts introduced by the added W-white are most noticeable.

The white transfer block 602 may be implemented in several ways. According to one embodiment, a video processor calculates the white segment output data value based on the results of the RGBW processing block and a stored white transfer function. According to another embodiment, the transfer function is stored in a memory lookup table. The white segment input data value is an index into the memory lookup table where the white segment output data value is stored.

FIG. 7 shows yet another block diagram of one possible implementation of a color wheel based display system having a white segment. In FIG. 7, the white transfer function is combined with a degamma function. The functions are typically combined using a lookup table 702 to perform both degamma and white transfer function scaling.

While the systems shown in FIGS. 5–7 eliminate the boundary artifacts that occur when the white segment is used in large increments above a predetermined threshold, the systems introduce hue errors into the displayed image. These hue errors occur because the white segment adds equal amounts of all three primary colors to the image pixel. Since equal amounts of all three primary colors are added regardless of the ratios of the primary color intensities, the hue of the pixel is changed. Specifically, the saturation level of the pixel is decreased.

The processing performed on a primary color component depends not on which primary component is being processed, but on the value of the primary color component relative to the other primary color component values. Therefore, the image data values will be referred to by their relative magnitudes—maximum, intermediate, and minimum. For example, $S_{max}$ refers to the largest of the three input or source primary color intensity values. $S_{mid}$ refers to the intermediate of the three source primary color intensity values. $S_{min}$ refers to the largest of the three source primary color intensity values.

While $S_{max}$ refers to the maximum of the three primary input intensity values, it should be understood that the terms source, input, and output are relative to the process being described, not to the display system. The display system described herein optionally performs many other image processing and manipulation processes. For example, it is envisioned that the display system performs motion detection in order to prevent or eliminate motion artifacts, interlace to progressive scan conversion, degamma processing, picture-in-a-picture processing, image scaling, and brightness and contrast adjustments as well as other processes. Typically, these other processes may be performed before or after the image data is converted for display by a four-segment color wheel based system. For the purposes of this disclosure, however, all other image processing is generally ignored in order to focus on the processing performed to scale the image data and enable the use of a four-segment color wheel. It is therefore to be understood that terms such as input data, or input intensity refer to the image data immediately prior to the three-segment to four-segment conversion and processing. Likewise, terms such as output data, or output intensity refer to the image data immediately following the three-segment to four-segment conversion and processing.

The hue errors can be eliminated by altering the intensity values of the primary colors to restore the original ratios between the primary colors. The original ratios are restored either by increasing the intensity data words for the maximum and intermediate primary color components or by decreasing the minimum and intermediate primary color components.

Correcting the hue errors by decreasing the minimum and intermediate primary color components is preferred since increasing the maximum value sometimes resulting in the maximum data value exceeding the input range of the display device. The equivalent value of each primary color is equal to the output primary color value ($P_x$) of that component plus the boost from the white segment ($W_{seg}$). The maximum primary color component ($P_{max}$) is equal to ($S_{max}+W_{seg}$). The desired ratio of the other intermediate and minimum colors to the maximum color is ($S_x$/Smax). Because some of the intensity value for all three primary colors is contributed by the white segment, the output intensity word for both the intermediate and minimum primary words are reduced by this amount. The following equations each express the output primary color data values for the intermediate and minimum primary color components:

$$P_x=(S_x/S_{max})(S_{max}+W_{seg})-W_{seg}$$

$$P_x=S_x+S_x*WSEG*(1/S_{max})-W_{seg}$$

Table 1 lists the source primary color data values ($S_x$), the output primary color data values ($P_x$), and the equivalent degrees for several pixels of input data. Each input intensity value in Table 1 is an integer value representing the decimal equivalent of an 8-bit word. The output intensity values in Table 1 are not rounded to the nearest integer to prevent rounding errors from corrupting data in later tables that is derived from the data in Table 1. The equivalent degrees shown in Table 1 assume a 45° white segment and 105° color segments.

TABLE 1

Eight-Bit White Segment with Hue Correction

| Input Intensity Values | | | Output Intensity Values | | | | Equivalent Wheel Degrees | | |
|---|---|---|---|---|---|---|---|---|---|
| $S_{red}$ | $S_{green}$ | $S_{blue}$ | $P_{max}$ | $P_{mid}$ | $P_{min}$ | $W_{seg}$ | $P_{max}°$ | $P_{mid}°$ | $P_{min}°$ |
| 255 | 255 | 255 | 255.00 | 255.00 | 255.00 | 255.00 | 150.00 | 150.00 | 150.00 |
| 250 | 250 | 250 | 250.00 | 250.00 | 250.00 | 250.00 | 147.06 | 147.06 | 147.06 |
| 200 | 200 | 200 | 200.00 | 200.00 | 200.00 | 200.00 | 117.65 | 117.65 | 117.65 |
| 150 | 150 | 150 | 150.00 | 150.00 | 150.00 | 150.00 | 88.24 | 88.24 | 88.24 |
| 100 | 100 | 100 | 100.00 | 100.00 | 100.00 | 100.00 | 58.82 | 58.82 | 58.82 |
| 50 | 50 | 50 | 50.00 | 50.00 | 50.00 | 50.00 | 29.41 | 29.41 | 29.41 |
| 240 | 240 | 120 | 240.00 | 240.00 | 60.00 | 120.00 | 120.00 | 120.00 | 45.88 |
| 240 | 120 | 60 | 240.00 | 90.00 | 15.00 | 60.00 | 109.41 | 47.65 | 16.76 |
| 240 | 60 | 30 | 240.00 | 37.50 | 3.75 | 30.00 | 104.12 | 20.74 | 6.84 |
| 240 | 30 | 15 | 240.00 | 16.88 | 0.94 | 15.00 | 101.47 | 9.60 | 3.03 |
| 240 | 120 | 60 | 240.00 | 90.00 | 15.00 | 60.00 | 109.41 | 47.65 | 16.76 |
| 120 | 60 | 30 | 120.00 | 45.00 | 7.50 | 30.00 | 54.71 | 23.82 | 8.38 |
| 60 | 30 | 15 | 60.00 | 22.50 | 3.75 | 15.00 | 27.35 | 11.91 | 4.19 |
| 100 | 100 | 0 | 100.00 | 100.00 | 0.00 | 0.00 | 41.18 | 41.18 | 0.00 |

TABLE 1-continued

Eight-Bit White Segment with Hue Correction

| Input Intensity Values | | | Output Intensity Values | | | | Equivalent Wheel Degrees | | |
|---|---|---|---|---|---|---|---|---|---|
| $S_{red}$ | $S_{green}$ | $S_{blue}$ | $P_{max}$ | $P_{mid}$ | $P_{min}$ | $W_{seg}$ | $P_{max}°$ | $P_{mid}°$ | $P_{min}°$ |
| 255 | 255 | 0 | 255.00 | 255.00 | 0.00 | 0.00 | 105.00 | 105.00 | 0.00 |
| 255 | 127 | 0 | 255.00 | 127.00 | 0.00 | 0.00 | 105.00 | 52.29 | 0.00 |
| 255 | 0 | 0 | 255.00 | 0.00 | 0.00 | 0.00 | 105.00 | 0.00 | 0.00 |
| 85 | 85 | 85 | 85.00 | 85.00 | 85.00 | 85.00 | 50.00 | 50.00 | 50.00 |

Table 2 shows the contribution of each primary color to the total pixel brightness for each set of input data from Table 1. As seen in Table 2, the hue correction equations shown above result in the output intensity word for each color ($P_x$) contributing the same amount toward the total pixel intensity as the input intensity word for the same color ($S_x$). Hue artifacts introduced by using the white segment of the color wheel are eliminated since the output primary color intensity words contribute the same percentage of the total pixel brightness as the corresponding input intensity words.

TABLE 2

Primary Color Contribution with Hue Correction

| Input Intensity Values | | | Contribution to Pixel Intensity (%) | | | | | |
|---|---|---|---|---|---|---|---|---|
| $S_{red}$ | $S_{green}$ | $S_{blue}$ | $S_{red}$ | $P_{red}$ | $S_{green}$ | $P_{green}$ | $S_{blue}$ | $P_{blue}$ |
| 255 | 255 | 255 | 0.33 | 0.33 | 0.33 | 0.33 | 0.33 | 0.33 |
| 250 | 250 | 250 | 0.33 | 0.33 | 0.33 | 0.33 | 0.33 | 0.33 |
| 200 | 200 | 200 | 0.33 | 0.33 | 0.33 | 0.33 | 0.33 | 0.33 |
| 150 | 150 | 150 | 0.33 | 0.33 | 0.33 | 0.33 | 0.33 | 0.33 |
| 100 | 100 | 100 | 0.33 | 0.33 | 0.33 | 0.33 | 0.33 | 0.33 |
| 50 | 50 | 50 | 0.33 | 0.33 | 0.33 | 0.33 | 0.33 | 0.33 |
| 240 | 240 | 120 | 0.40 | 0.40 | 0.40 | 0.40 | 0.20 | 0.20 |
| 240 | 120 | 60 | 0.57 | 0.57 | 0.29 | 0.29 | 0.14 | 0.14 |
| 240 | 60 | 30 | 0.73 | 0.73 | 0.18 | 0.18 | 0.09 | 0.09 |
| 240 | 30 | 15 | 0.84 | 0.84 | 0.11 | 0.11 | 0.05 | 0.05 |
| 240 | 120 | 60 | 0.57 | 0.57 | 0.29 | 0.29 | 0.14 | 0.14 |
| 120 | 60 | 30 | 0.57 | 0.57 | 0.29 | 0.29 | 0.14 | 0.14 |
| 60 | 30 | 15 | 0.57 | 0.57 | 0.29 | 0.29 | 0.14 | 0.14 |
| 100 | 100 | 0 | 0.50 | 0.50 | 0.50 | 0.50 | 0.00 | 0.00 |
| 255 | 255 | 0 | 0.50 | 0.50 | 0.50 | 0.50 | 0.00 | 0.00 |
| 255 | 127 | 0 | 0.67 | 0.67 | 0.33 | 0.33 | 0.00 | 0.00 |
| 255 | 0 | 0 | 1.00 | 1.00 | 0.00 | 0.00 | 0.00 | 0.00 |
| 85 | 85 | 85 | 0.33 | 0.33 | 0.33 | 0.33 | 0.33 | 0.33 |

Although the equations listed above eliminate the hue errors introduced by merely adding a white component created by a clear color wheel segment, other artifacts are added to the image. These artifacts are due to the unequal gain that is applied to pixels having different saturation levels. Specifically, the brightness of saturated pixels is not increased while the brightness of unsaturated pixels, especially white or gray pixels, is increased.

Table 3 shows the gain that is applied to pixels of various saturation levels. Table 3 lists the intensity, gain, and saturation data the same input intensity data listed above in Tables 1 and 2. In Table 3, the output intensity for a three-segment system is the intensity of the input intensity data words as displayed on a three-segment color wheel system relative to the maximum intensity of the three-segment color wheel system. The output intensity of the four-segment system is the intensity of the output intensity data words using a four-segment color wheel system relative to the maximum intensity of the three-segment system. Gain is the ratio of the four segment output intensity to the three segment output intensity. White content is a measure of the color saturation and is equal to the ratio of the minimum and maximum output intensity words. As shown by Table 3, the gain applied to each pixel is inversely related to the saturation level of the pixel.

TABLE 3

Intensity Gain with Hue Correction

| Input Intensity Values | | | Output Intensity | | Gain Using | White |
|---|---|---|---|---|---|---|
| $S_{red}$ | $S_{green}$ | $S_{blue}$ | 3-Segment | 4-Segment | 4-Segment | Content |
| 255 | 255 | 255 | 1.000 | 1.250 | 1.250 | 1.000 |
| 250 | 250 | 250 | 0.980 | 1.225 | 1.250 | 1.000 |
| 200 | 200 | 200 | 0.784 | 0.980 | 1.250 | 1.000 |
| 150 | 150 | 150 | 0.588 | 0.735 | 1.250 | 1.000 |
| 100 | 100 | 100 | 0.392 | 0.490 | 1.250 | 1.000 |
| 50 | 50 | 50 | 0.196 | 0.245 | 1.250 | 1.000 |
| 240 | 240 | 120 | 0.784 | 0.794 | 1.013 | 0.500 |
| 240 | 120 | 60 | 0.549 | 0.483 | 0.879 | 0.250 |
| 240 | 60 | 30 | 0.431 | 0.366 | 0.848 | 0.125 |
| 240 | 30 | 15 | 0.373 | 0.317 | 0.851 | 0.063 |
| 240 | 120 | 60 | 0.549 | 0.483 | 0.879 | 0.250 |
| 120 | 60 | 30 | 0.275 | 0.241 | 0.879 | 0.250 |
| 60 | 30 | 15 | 0.137 | 0.121 | 0.879 | 0.250 |
| 100 | 100 | 0 | 0.261 | 0.229 | 0.875 | 0.000 |
| 255 | 255 | 0 | 0.667 | 0.583 | 0.875 | 0.000 |
| 255 | 127 | 0 | 0.499 | 0.437 | 0.875 | 0.000 |
| 255 | 0 | 0 | 0.333 | 0.292 | 0.875 | 0.000 |
| 85 | 85 | 85 | .333 | .417 | 1.250 | 1.000 |

Since the gain realized using the system described thus far is dependent on the white level of each pixel, unsaturated areas become relatively brighter than saturated regions having the same initial brightness. For example, a pixel with input intensity values of 255:0:0 and a pixel with input intensity values of 85:85:85 each have an input intensity level of 0.333 as shown in Table 3. The pixel whose input intensity values are 255:0:0 is saturated and has an output intensity value of 0.292, less than the input intensity. An unsaturated input pixel with the same input intensity has an output intensity of 0.417, a gain of 1.25 compared to the input intensity values and a gain of 1.43 compared to a saturated pixel with the same input intensity.

Since the unsaturated portions of an image will become relatively brighter than the saturated portions of the image, the display system introduces gain errors or artifacts, and the output image is not a perfect representation of the input image data. Because the clear segment of the color wheel cannot be used to increase the brightness of a saturated pixel, this image artifact cannot be eliminated by processing the image data. The artifact is reduced, but not eliminated, by further processing.

The gain artifact created by the gain differential between saturated and unsaturated pixels cannot be eliminated. Completely-saturated maximum-intensity pixels cannot utilize the light gain made available by the clear segment. Since the brightness of the completely-saturated maximum-intensity pixels cannot be increased, any gain applied to other pixels creates results in a gain artifact. Controlling the gain applied to the primary color components of a pixel minimizes the effect of the gain artifact.

The gain applied to each primary color component of a pixel is based on the saturation level and intensity level of the pixel. Completely unsaturated pixels, that is pixels with equal primary color components, make the most efficient use of the clear segment of the color wheel. The gain applied to the primary color components of unsaturated pixels is less than the gain applied to the primary color components of saturated pixels-which do not use the clear segment of the color wheel.

As described above, the total gain applied to each pixel ideally is constant regardless of the saturation level of each pixel. Since the gain contributed by the clear segment of the color wheel depends on the white content of the input pixel data, a gain correction is applied to each of the three primary color intensity values. The magnitude of this gain correction depends on the saturation level of the pixel.

The white content of the pixel determines both the saturation level of the pixel and the intensity value used for the white segment period. As described above, the white content is equal to the minimum of the three primary color intensity values, or $S_{min}$. The white content of a pixel is adjusted in order to adjust the image. As described above, the actual white segment output data value ($W_{out}$) typically is determined by applying a transfer function to the value of the white content ($S_{min}$) for the pixel. For example:

$$W_{Out}=WTF(S_{min})$$

where WTF( ) is a non-linear function that reduces the amount of white segment used for pixels with a low white content, regardless of the saturation level of the pixel.

While the above equation determines the data value for the white segment, the actual impact of the white segment depends on the gain of the white segment compared to the three primary color segments. The light gain of the white segment is expressed by the ratio of full-on white segment lumens to the full-on primary color segment lumens. Thus, the output equivalent white segment value prior to any gain correction is equal to:

$$W_{segpre}=WTF(PIXINMIN)*DG*LG$$

where PIXINMIN is the minimum of the three primary color intensity words input to the gain correction circuit, DG is a scale factor used to control the effect of the white segment on the light gain calculations, and LG is the light gain of the white segment.

The output equivalent white segment value is the measure of saturation that determines the gain applied to a given pixel. The gain level applied to a saturated color pixel is given by:

$$SCGAINL=PIXINMAX*(1+TONEFACT)/(PIXINMAX+W_{segpre})$$

where PIXINMAX is the maximum of the three primary color intensity words input to the gain correction circuit and TONEFACT is a constant between 0.0 and 1.0 used to subjectively adjust the "look" of a display system. Since this equation uses $W_{segpre}$, instead of $W_{out}$, the measure of saturation it returns includes an adjustment for the various effects of the display system, including a selected white transfer function and the efficiency of the color wheel white segment. SCGAINL is limited to a minimum of 1.0 and a maximum of SCGMAX. Assuming the output equivalent white segment value ($W_{segpre}$) is equal to the white content of a pixel, the gain for a saturated pixel is equal to one plus TONEFACT. This gain is twice the gain of a fully unsaturated pixel (PIXINMAX=PIXINMIN=$W_{segpre}$).

Two artifacts are introduced by using the saturated color gain level to increase the gain of saturated and partially saturated pixels. First, quantization and rounding errors are introduced. As mentioned above with respect to the white segment transfer function, these quantization and rounding errors are noticeable on very dim pixels. Therefore, it is best to minimize the processing performed on the dim pixels in order to avoid introducing additional quantization and rounding errors.

The second artifact introduced by simply increasing the gain of saturated and partially saturated pixels is the result of clipping. As the value of the primary color intensity words approaches the maximum value that can be displayed, the gain applied to the pixel will cause the amplified intensity word to exceed the maximum value. Clipping the output intensity word to the maximum value creates false contours since some of the intensity information is lost. The gain applied to high-intensity pixels is reduced to prevent clipping. Reducing the gain of the high-intensity pixels still introduces some artifacts, but only in the bright portions of an image where the human eye is less likely to perceive the reduced intensity gradations.

FIG. 8 is a plot of the desired gain curve for the gain correction. In FIG. 8, the input intensity is plotted on the x-axis and the output intensity is plotted on the y-axis. A unity gain response is indicated by line 802. Line 804 is the response of a system with a gain value equal to the saturated color gain level (SCGAINL) shown above. The system represented by line 804 clips the output before the input value reaches a maximum. As described above, the gain of high-intensity pixels is reduced, as indicated by segment 806, to avoid clipping.

In order the minimize quantization and rounding errors, the ideal gain function provides a unity gain for the very dim pixels, a higher gain for mid-intensity pixels, a reduced-gain high-intensity portion to avoid clipping, and smooth transitions between the segments. One such gain function is indicated by segments 810, 808, 812, and 806 of FIG. 8. Because the plot of the gain function is an "S" shape, the gain function is referred to as an s-curve.

One possible s-curve is found by subtracting both a low-end correction factor and a high-end correction factor from the saturated color gain level as determined by the following equations:

$$SCGAIN=SCGAINL-(HECF)-(LECF) \; HECF=((PIXINMAX-INT_{knee})/(MAX\_VALUE-INT_{knee}))*(SCGAINL-1) \; LECF=((TERMOFF-PIXINMAX)/(TERMOFF-STARTOFF))*(SCGAINL-1)$$

where:
  HECF is the high-end correction value and is clamped to a minimum value of 0;
  LECF is the low-end correction value and is clamped to a minimum value of 0;
  $INT_{knee}$ is the knee of the intensity gain curve indicated by "C" in FIG. 8;
  TERMOFF is the $S_{max}$ value where SCGAIN equals SCGAINL as indicated by "B" in FIG. 8;
  STARTOFF is the PIXINMAX value where SCGAIN first deviates from unity gain as indicated by "A" in FIG. 8; and SCGAIN is clamped to a minimum value of one.

Once the value of SCGAIN is determined, it is used to determine each of the three primary color intensity output values. Typically, each of the primary color intensity input values are scaled by the SCGAIN value as follows:

PIXOUT=SCGAIN*PIXIN where PIXIN is the input intensity value for a given primary color and PIXOUT is the output intensity value for the same primary color. Gain correction is therefore accomplished by assigning an intensity value to a white component output intensity word based on a minimum primary color input word, determining the saturation level of a pixel, calculating a gain level based on that saturation level, adjusting the gain level based on a maximum of the three primary color input intensity values, and scaling each of the input intensity words by the adjusted gain level.

The gain correction system and method described above not only eliminate the gain artifacts introduced by the use of the color wheel, they also provide a significant brightness gain to the mid-tone and saturated pixels. As discussed above, the brightness of a display is a key performance measure used to compare competing display system. Therefore, the ability to utilize a white, or clear, segment without having to calibrate the system, the ability to correct hue errors introduced by the use of the white segment, the ability to correct gain errors introduced by the use of the white segment, and the mid-tone and saturated pixel brightness gain provided by the gain correction provide a significant competitive advantage to systems employing these techniques.

FIG. 9 is a block diagram of a display system 902 utilizing both hue and gain correction as described above. In FIG. 9, the gain correction processing is performed in block 904 prior to the RGBW processing and hue correction which are implemented by block 906. Gain correction block 904 receives values for $INT_{knee}$, TERMOFF, STARTOFF, TONEFACT, and SCGMAX which are determined experimentally and stored in gain shaping registers 908. Both the gain correction 904 and hue correction 906 blocks receive stored light gain information from the light gain register 910 which is used to determine the equivalent intensity of the white segment data value.

Many alternative to the system described above are possible. For example, the hue correction may be performed prior to the gain correction assuming the equations detailed above are adjusted to compensate for the changed processing order. Likewise, system 902 may include a bypass data path to allow only hue correction or only gain correction. Additionally, although the white segment has been described as having the same intensity word resolution as the primary color intensity words, the use of more or less bits is possible with the possible introduction of image artifacts. For example, with proper adjustment of the hue and gain equations, alternative embodiments utilize a 6-bit white segment and 8-bit primary color segments.

Various embodiments of the display system 902 taught herein utilize various clear segment sizes. The example used throughout this description, which uses a 45° clear segment, was chosen primarily for convenience. Systems utilizing a color segment typically use other segment sizes such as a 68° clear segment. Display systems with larger clear segments are capable of displaying brighter unsaturated images, but the potential brightness of saturated images is reduced. Likewise, various embodiments of display system 902 utilize color wheels having more than four segments. It should be understood that all references to four segment color wheels refer to color wheels having at least one clear or white segment and at least three unique primary color segments, while references to three segment color wheels refer to color wheels having at least three unique primary color segments. Various system-level design issues may recommend the use of multiple segments for a given primary color, for example two separate red segments, and references to four segment color wheels are intended to cover color wheels having additional segments of one or more of the three unique colors and white.

Thus, although there has been disclosed to this point a particular embodiment for a display system and method for brightness gain using a white segment with hue and gain correction, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of converting image data from a three-primary color system to a three-primary and one-combined color system, said method comprising the steps of:
   providing three-color image data for a pixel, said three-color image data comprising an input primary color intensity word for each of three colors;
   assigning a value dependent on a smallest of said primary color intensity input words to a combined color intensity word; and
   scaling said primary color intensity input words to create primary color intensity output words.

2. The method of claim 1, said step of assigning a value to a combined color intensity word comprises the step of setting said combined color intensity word equal to said smallest of said primary color intensity input words.

3. The method of claim 1, said step of assigning a value to a combined color intensity word comprises the step of setting said combined color intensity word equal to a function of said smallest of said primary color intensity input words.

4. The method of claim 1, said step of assigning a value to a combined color intensity word comprises the step of setting said combined color intensity word equal to a non-linear function of said smallest of said primary color intensity input words.

5. The method of claim 1, said step of assigning a value to a combined color intensity word comprises the step of setting said combined color intensity word equal to said smallest of said primary color intensity input words squared divided by a maximum value of said primary color intensity words.

6. The method of claim 1, said step of assigning a value to a combined color intensity word implemented by indexing a lookup table with said smallest of said primary color intensity input words and using an output of said lookup table as said combined color intensity word.

7. The method of claim 1, said step of scaling said primary color intensity input words to create primary color intensity output words implemented by indexing a lookup table with each of said primary color intensity input words and using an output of said lookup table as one of said primary color intensity output words.

8. The method of claim 1, said step of scaling said primary color intensity input words to create primary color intensity output words implemented by indexing a lookup table with each of said primary color intensity input words and using an output of said lookup table as one of said primary color intensity output words, said lookup table performing a degamma translation.

9. The method of claim 1, said step of providing three color image data for a pixel comprising the step of providing a red, green, and blue image data word for said pixel.

10. The method of claim 1, said step of assigning a value to a combined color intensity word comprising the step of assigning a value to a white intensity word.

11. A method of converting image data from a three primary color system to a three primary and one combined color system, said method comprising the steps of providing three-color image data for a pixel, said three-color image data comprising a primary color intensity input word for each of three colors;

assigning a value dependent on a smallest of said primary color intensity input words to a combined color intensity word; and assigning a value to each of three primary color intensity output words, said primary color intensity output words corresponding to said primary color intensity input words, each said assigned value equal to the sum of said corresponding primary color intensity input word plus a hue correction value.

12. The method of claim 11, said step of assigning a value to each primary color intensity output words comprising the steps of:

determining at least one maximum of said three primary color intensity input words; and setting one of said three primary color intensity output words corresponding to said at least one maximum of said three primary color intensity input words equal to said maximum of said three primary color intensity input words.

13. The method of claim 12, said step of assigning a value to each of three primary color intensity output words comprising the steps of:

setting said primary color intensity output words corresponding to each of said three primary color intensity input words that is not equal to said maximum of said three primary color intensity input words equal to:

$$S_x + (S_x * WSEG * (1/S_{max})) - WSEG$$

where:

$S_x$ is said corresponding primary color intensity input word;

$S_{max}$ is said at least one maximum of said primary color intensity input words; and WSEG is the equivalent value of said combined color intensity word.

14. A method of converting image data from a three primary color system to a three primary and one combined color system, said method comprising the steps of:

providing three-color image data for a pixel, said three-color image data comprising a primary color input intensity word for each of three primary colors;

assigning a white component intensity value as a function of a minimum of said primary color input intensity words;

determining a saturation value for the pixel;

calculating a gain level based on said saturation level;

adjusting said gain level based on a maximum of said three primary color input intensity words; and scaling each of said primary color input intensity words by the adjusted gain level to achieve an output intensity word for each of said three primary colors.

15. The method of claim 14, said step of assigning a white component intensity value as a function of a minimum of said primary color intensity input words further comprising:

assigning said white component intensity value equal to $WTF(S_{min})$, where $S_{min}$ is a minimum of said three primary color input intensity words and $WTF(\ )$ is a white level transfer function.

16. The method of claim 14, said step of determining a saturation value for the pixel comprising the step of;

comparing a maximum of said primary color input intensity words with a minimum of said primary color input intensity words.

17. The method of claim 14, said step of calculating a gain level based on said saturation level further comprising setting said gain level (SCGAINL) equal to:

$$SCGAINL = PIXINMAX * (1 + TONEFACT)/(PIXINMAX + W_{segpre})$$

where PIXINMAX is a maximum of said three primary color input intensity words and TONEFACT is a predetermined value between 0.0 and 1.0 used to adjust the appearance of the displayed image.

18. The method of claim 17, said step of adjusting said gain level based on a maximum of said three primary color input intensity words further comprising determining an adjusted gain level (SCGAIN) equal to:

$$SCGAIN = SCGAINL - (HECF) - (LECF), \text{ where:}$$

$$HECF = ((PIXINMAX - INT_{knee})/(MAX\_VALUE - INT_{knee})) * (SCGAINL - 1),$$

and is clamped to a minimum value of 0;

$$LECF = ((TERMOFF - PIXINMAX)/(TERMOFF - STARTOFF)) * (SCGAINL - 1), \text{ and is clamped to a minimum value of 0;}$$

$INT_{knee}$ is a predetermined value indicating a knee of an intensity gain curve;

TERMOFF is a predetermined value indicating a point where SCGAIN equals SCGAINL;

STARTOFF is a predetermined value indicating a point where SCGAIN first deviates from unity gain; and SCGAIN is clamped to a minimum value of one.

19. The method of claim 18, said step of scaling each of said primary color input intensity words by the adjusted gain level to achieve an output intensity word for each of said three primary colors comprising:

setting each said primary color output intensity word equal to:

$$PIXOUT = SCGAIN * PIXIN$$

where PIXIN is a primary color input intensity word and PIXOUT is the corresponding primary color output intensity word.

20. A display system comprising:

an image data processing circuit for receiving an input signal representing three primary color intensity words and generating a four color output signal comprised of an intensity data word for each of three primary colors and a combined color, said image data processing circuit comprising:

a combined color intensity data generating circuit for generating an intensity word for said combined color;

a gain correction circuit for adjusting said primary color intensity data
based on a saturation level of said intensity data; and
a hue correction circuit for adjusting said primary color intensity data to compensate for the addition of said combined color intensity data; and
an image forming device for receiving said four color output signal and forming an image in response to said four color output signal.

21. The display system of claim 20, said image forming device comprising:
a light source for generating a light beam, said light beam sequentially comprised of three primary colored light beams and a combined color light beam.

22. The display system of claim 21, said light source comprising:
a white light source for generating a beam of white light; and
a color filter for receiving said beam of white light and filtering said beam of white light, said color filter comprising three primary color segments and a segment for outputting an output beam of white light.

23. The display system of claim 20, said image data processing circuit comprising:
a combined color intensity data generating circuit for generating an intensity word for said combined color;
a gain correction circuit for adjusting said primary color intensity data based on a saturation level of said intensity data; and
a hue correction circuit for adjusting said primary color intensity data to
compensate for the addition of said combined color intensity data.

24. A method of converting image data from a three-primary color system to a three-primary and one-combined color system, said method comprising the steps of:
providing three-color image data for a pixel, said three-color image data comprising a primary color intensity word for each of three colors;
determining at least one minimum primary color intensity word and at least one maximum primary color intensity word of said primary color intensity words;
assigning a value dependent on said at least one minimum primary color intensity input word to a combined color intensity word;
determining an intensity for said pixel represented by a combination of said at least one maximum primary color intensity word and said combined color intensity word; and
scaling said primary color intensity words such that a ratio of an intensity for said pixel represented by each said scaled primary color intensity word in combination with said combined color intensity word divided by said intensity of said pixel represented by said combination of said at least one maximum primary color intensity word and said combined color intensity word is equal to a ratio of each said primary color intensity word divided by said at least one maximum primary color intensity word.

25. The method of claim 23, said step of assigning a value to a combined color intensity word comprises the step of setting said combined color intensity word equal to said at least one minimum primary color intensity word.

26. The method of claim 23, said step of assigning a value to a combined color intensity word comprises the step of setting said combined color intensity word equal to a function of said at least one minimum primary color intensity word.

27. The method of claim 23, said step of assigning a value to a combined color intensity word comprises the step of setting said combined color intensity word equal to a non-linear function of said at least one minimum primary color intensity word.

28. The method of claim 23, said step of assigning a value to a combined color intensity word comprises the step of setting said combined color intensity word equal to said at least one minimum primary color intensity word squared divided by said at least one maximum primary color intensity word.

29. The method of claim 23, said step of assigning a value to a combined color intensity word implemented by indexing a lookup table with said at least one minimum primary color intensity input word and using an output of said lookup table as said combined color intensity word.

30. The method of claim 23, said step of assigning a value to a combined color intensity word comprising the step of assigning a value to a white intensity word.

31. The method of claim 23, said step of providing three-color image data for a pixel comprising the step of providing a red, green, and blue intensity word for said pixel.

32. The method of claim 23, said step of scaling said primary color intensity words implemented by indexing a lookup table with each of said primary color intensity words.

33. The method of claim 31, said step indexing a lookup table with each of said primary color intensity words also performing a degamma translation.

* * * * *